United States Patent Office 2,749,341
Patented June 5, 1956

2,749,341
NEW ANTHRAQUINONE VAT DYESTUFFS

Max Staeuble, Basel, Switzerland, assignor to Ciba Limited, Basel, Switzerland, a Swiss firm No Drawing. Application July 13, 1953,
Serial No. 367,719

Claims priority, application Switzerland July 23, 1952

7 Claims. (Cl. 260—247.1)

This invention provides new anthraquinone vat dyestuffs which, like the dyestuff of the constitution (1)
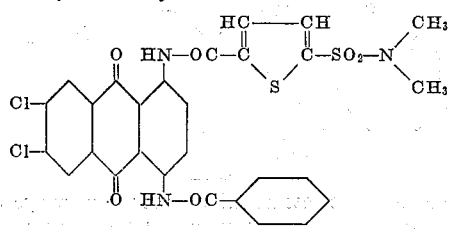

correspond to the general formula (2)
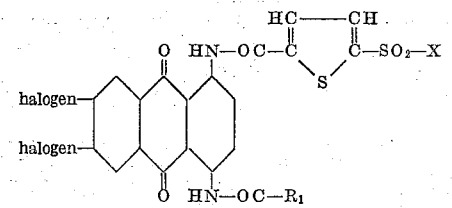

in which $R_1$ represents a radical of the benzene series and X stands for one of the radicals $$-N\begin{matrix}C_mH_{2m+1}\\C_nH_{2n+1}\end{matrix}$$

$$-N\begin{matrix}CH_2CH_2\\ \phantom{xx} \searrow O\\CH_2CH_2\end{matrix}$$

and $$-N\begin{matrix}CH_2CH_2\\ \phantom{xx} \searrow CH_2\\CH_2CH_2\end{matrix}$$

wherein $m$ and $n$ each represents a whole number of at the most 3.

The invention also includes a process for making these new dyestuffs, wherein the amino group in the 1-position of a 1-amino-4-acylamino-6:7-dihalogen-anthraquinone is acylated, and the starting materials are so chosen that one of the acyl radicals in the vat dyestuff so obtained is a benzoyl radical, which may contain further substituents, and the other acyl radical corresponds to the formula (3)
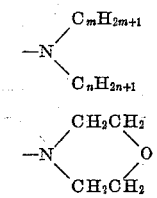

wherein X has the above-mentioned meaning.

The 1-amino-4-acylamino - 6:7 - dihalogen - anthraquinones used as starting materials in the present process may contain two identical halogen atoms in the 6- and 7-positions, for example, 2 chlorine atoms or 2 bromine atoms, or may contain in those positions two different halogen atoms, for example, a chlorine atom and a fluorine, bromine or iodine atom.

The benzene radical which is present in the 1-amino-4-acylamino-6:7-dihalogenanthraquinone or is introduced into it may contain further substituents such as are customarily present in vat dyestuffs, for example, halogen atoms such as chlorine or bromine, alkyl or alkoxy groups of low molecular weight such as methyl or methoxy groups, or a phenyl radical bound directly to the benzoyl radical. However, the benzoyl radical is advantageously free from sulfone groups and sulfonamide groups, or, stated more generally, the starting materials are advantageously so chosen that the resulting dyestuff contains in the acyl radicals as the sole sulfur-containing substituent the sulfonic acid amide group present in the radical of the Formula 3.

The acyl radicals of the Formula 3 are derived from thiophene-2-carboxylic acid-5-sulfonic acid, and advantageously contain alkyl groups of low molecular weight, for example, methyl, ethyl, n-propyl or isopropyl groups. The two alkyl groups may be connected together, for example, at their end carbon atoms, directly or through a hetero-atom, so that together with the nitrogen atom of the sulfonic acid amide group they form a further heterocyclic ring, for example, a morpholine or piperidine ring.

The 1-amino-4-acylamino-6:7-dihalogenanthraquinones used as starting materials may, as will be apperent from the foregoing statements, contain as the acyl radical either a benzoyl radical or a radical of the Formula 3. They can be made by methods in themselves known, for example, by monoacylating 1:4-diamino-6:7-dihalogenanthraquinones or by the reduction of 1-nitro-4-acylamino-6:7-dihalogenanthraquinones, which latter can be made by acylating 1-nitro-4-amino-6:7-dihalogen anthraquinones.

The further acylation of the resulting 1-amino-4-acylamino-6:7-dihalogen anthraquinones with the benzoylating agents or acylating agents capable of introducing the radical of the Formula 3 can be carried out, also by methods in themselves known, and advantageously with the use of the corresponding carboxylic acid halides, especially the chlorides. It is of advantage to carry out the acylation in a high boiling solvent such as dichlorobenzene or nitrobenzene at a raised temperature, for example, a temperature above 100° C., if desired with the addition of an acid-binding agent and/or a catalytically active agent such as pyridine, diethylamine or sodium carbonate.

The new dyestuffs of this invention, which correspond to the above Formula 2, can be used as pigment dyestuffs and also for dyeing or printing a very wide variety of materials, especially cellulose-containing materials such as cotton, linen or artificial silk or staple fibers of regenerated cellulose. If desired, they may be used in the form of their leuco-ester salts prepared in the usual manner and applied by the methods known for this class of dyestuffs. The dyeings are usually distinguished by their pure tint and good properties of fastness.

The following examples illustrate the invention, the parts and percentages being by weight unless otherwise stated and the relationship of parts by weight to parts by volume being the same as that of the kilogram to the liter:

Example 1

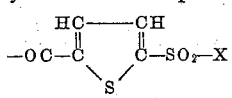

2.6 parts of thiophene-5-sulfonic acid dimethylamide-2-carboxylic acid melting at 178° C. (prepared from thiophene-2-carboxylic acid-5-sulfonic acid chloride and dimethylamine) are stirred for ½ hour at 90° C. with 2 parts of thionyl chloride in 50 parts of dry nitrobenzene, and then condensed with 4.2 parts of 1-amino-4-benzoylamino-6:7-dichloroanthraquinone at 120° C. for 2 hours. After cooling the mixture, the dyestuff which has precipitated in the form of violet-red lamellae is filtered off and washed with alcohol. There are obtained about 5.4 parts of the dyestuff of the formula

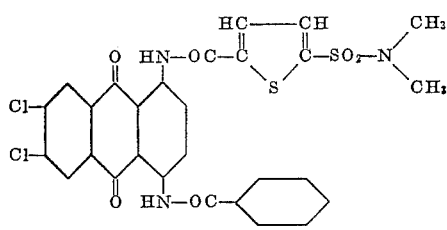

This dyestuff dyes cotton from an olive-green hydrosulfite vat fast pure reddish violet tints.

*Example 2*

1.3 parts of thiophene-2-carboxylic acid-5-sulfonic acid dimethylamide are stirred for ½ hour at 90° C. with 1.2 parts of thionyl chloride in 30 parts of dry nitrobenzene, and then condensed with 2.3 parts of 1-benzoyl-amino-4-amino-6-chloro-7-bromanthraquinone at 125–130° C. for 2 hours. After cooling the mixture, the dyestuff which has crystallized out is filtered off, washed with alcohol, and dried in vacuo at 110° C. There are obtained about 3 parts of the dyestuff, which is obtained by recrystallization from nitrobenzene in the form of violet-red lamellae. This dyestuff dyes cotton from an olive green hydrosulfite vat fast pure violet-red tints. This dyestuff, which contains one atom of chlorine and one atom of bromine per molecule, dyes a somewhat more bluish tint than the dyestuff described in Example 1 which contains a chlorine atom in each of the 6- and 7-positions of the anthraquinone nucleus.

1 - benzoylamino - 4 - amino-6-chloro-7-bromanthraquinone can be prepared from 2-chloro-3-bromanthraquinone (obtained from 2-amino-3-bromanthraquinone by diazotization followed by reaction with cuprous chloride) by nitration, reduction, conversion of the amine so obtained into its oxamic acid, further nitration, splitting off of the oxalic acid radical, benzoylation and reduction.

*Example 3*

1.5 parts of thiophene-2-carboxylic acid-5-sulfonic acid diethylamide (prepared from thiophene-2-carboxylic acid-5-sulfonic acid chloride and diethylamine) are heated with 1.5 parts of thionyl chloride and 30 parts of dry nitrobenzene for ½ hour at 90–100° C. to form thiophene-5-sulfonic acid diethylamide-2-carboxylic acid chloride, and the latter, in the manner described in Example 1, is condensed with 2.1 parts of 1-amino-4-benzoylamino-6:7-dichloranthraquinone to form the dyestuff and the latter is worked up. There are obtained about 2.4 parts of the dyestuff of the formula

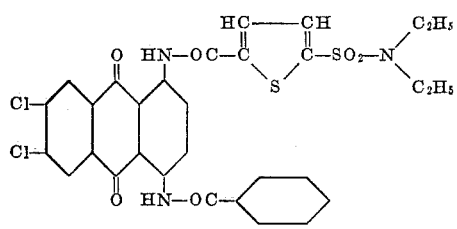

It dyes cotton from an olive-green hydrosulfite vat fast wine red tints.

By using, instead of 1.5 parts of thiophene-2-carboxylic acid-5-sulfonic acid diethylamide, 1.55 parts of thiophene-2-carboxylic acid-5-sulfonic acid piperidine (obtained from thiophene-2-carboxylic acid-5-sulfonic acid chloride and piperidine) there are obtained about 2.3 parts of the dyestuff of the formula

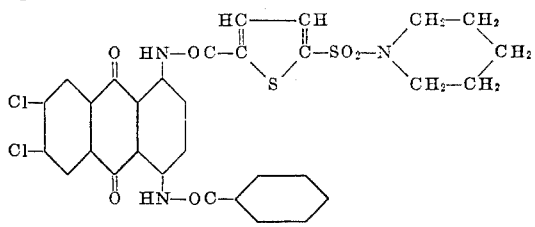

By using, instead of 1.5 parts of thiophene-2-carboxylic acid-5-sulfonic acid diethylamide, 1.55 parts of thiophene-2-carboxylic acid-5-sulfonic acid morpholide (obtained from thiophene-2-carboxylic acid-5-sulfonic acid chloride and morpholine) there are obtained about 2.7 parts of the dyestuff of the formula

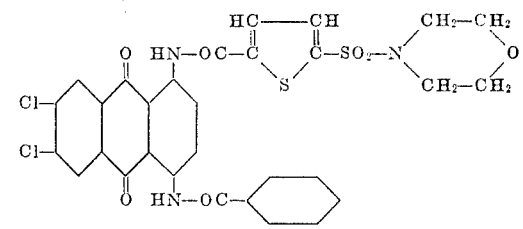

The two dyestuffs last mentioned above also dye cotton from an olive-green hydrosulfite vat fast wine red tints.

*Example 4*

2.9 parts of thiophene-2-carboxylic acid-5-sulfonic acid isopropyl-methyl-amide (obtained, for example, from thiophene-2-carboxylic acid-5-sulfonic acid chloride and isopropylamine followed by methylation at the nitrogen atom of the resulting thiophene-2-carboxylic acid-5-sulfonic acid isopropylamide by means of dimethylsulfate and a solution of sodium hydroxide) are stirred in 50 parts of dry nitrobenzene with 2 parts of thionyl chloride for ½ hour at 90–95° C., and then condensed, as described in Example 1, with 4.2 parts of 1-amino-4-benzoylamino-6:7-dichloranthraquinone. After working up there are obtained about 5.5 parts of the dyestuff of the formula

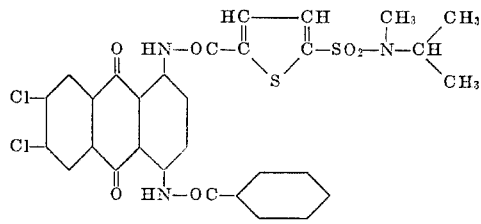

It dyes cotton from an olive-green hydrosulfite vat fast pure violet-red tints.

*Example 5*

1.3 parts of thiophene-2-carboxylic acid-5-sulfonic acid dimethylamide are stirred with 1.5 parts of thionyl chloride in 40 parts of dry nitrobenzene for ½ hour at 90° C., and then condensed with 2.25 parts of 1-amino-4-(para - chlorobenzoylamino) - 6:7 - dichloranthraquinone for 2 hours at 130° C. After cooling the mixture, the crystalline precipitate of the dyestuff is filtered off, washed with alcohol, and dried in vacuo at 110° C. There are obtained about 2.2 parts of the dyestuff of the formula

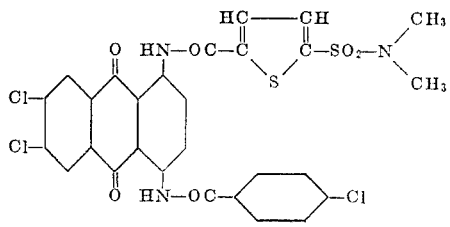

It dyes cotton from an olive-green hydrosulfite vat fast violet tints.

*Example 6*

1.4 parts of the dyestuff obtained as described in Example 1 are vatted with 4 parts of sodium hydrosulfite and 8 parts by volume of sodium hydroxide solution of 30 per cent. strength in 200 parts of water at 40–50° C. A dyebath is prepared which contains in 2000 parts of water, 2 parts of sodium hydrosulfite and 4 parts by volume of sodium hydroxide solution of 30 per cent. strength, and the stock solution described above is added. 100 parts of cotton are then entered at 25° C., after 15 minutes 40 parts of sodium chloride are added, and dyeing is continued for one hour at 25–30° C. The cotton is then squeezed, oxidized in the air, rinsed, acidified, again rinsed and advantageously soaped at the boil. There is obtained a pure reddish violet dyeing having good properties of fastness.

What is claimed is:

1. An anthraquinone vat dyestuff of the formula

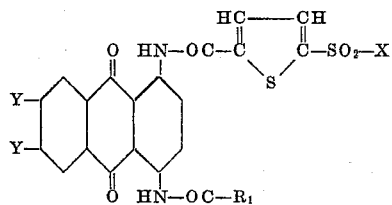

in which $R_1$ stands for an aromatic radical selected from the group consisting of the benzene and chlorobenzene radicals, X stands for a member selected from the group consisting of the radicals

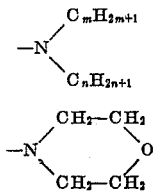

and

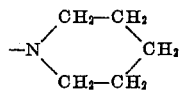

wherein $m$ and $n$ each represent a whole number of at the most 3, and Y stands for a member selected from the group consisting of Cl and Br.

2. An anthraquinone vat dyestuff of the formula

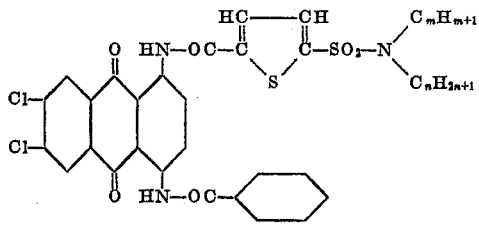

wherein $m$ and $n$ each represent a whole number of at the most 3.

3. The anthraquinone vat dyestuff of the formula

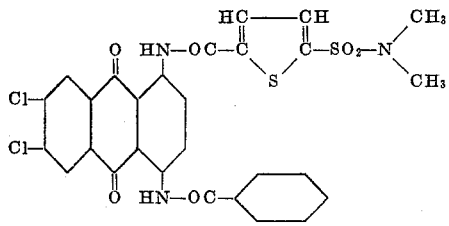

4. The anthraquinone vat dyestuff of the formula

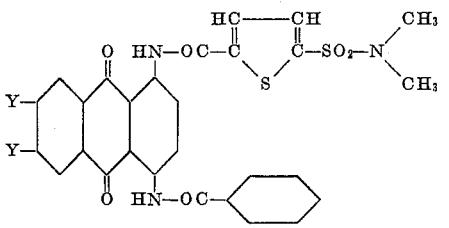

wherein one Y represents a chlorine atom and the other Y represents a bromine atom.

5. The anthraquinone vat dyestuff of the formula

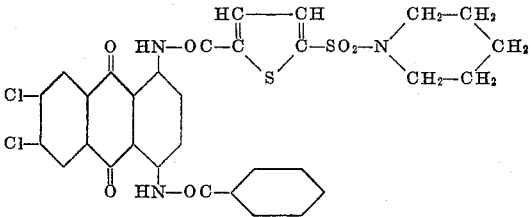

6. The anthraquinone vat dyestuff of the formula

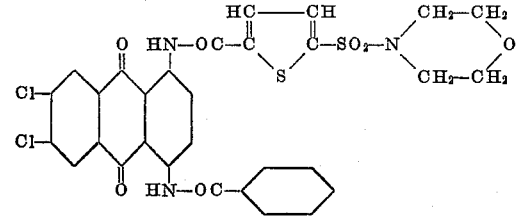

7. The anthraquinone vat dyestuff of the formula

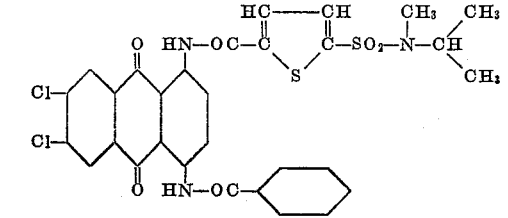

References Cited in the file of this patent

UNITED STATES PATENTS

| | | |
|---|---|---|
| 2,505,253 | Pitman et al. | Apr. 25, 1950 |
| 2,506,024 | Jenny et al. | May 2, 1950 |

OTHER REFERENCES

Simons: Ind. and Eng. Chem., vol. 39, p. 238.